Dec. 17, 1929.  L. F. FISHER  1,739,831
TOASTER
Filed June 15, 1928  3 Sheets-Sheet 1

Inventor:
Lee Forrest Fisher,
By Hugh K. Wagner,
Attorney.

Dec. 17, 1929.   L. F. FISHER   1,739,831
TOASTER
Filed June 15, 1929   3 Sheets-Sheet 2

Inventor;
Lee Forrest Fisher,
By Hugh H. Wagner,
Attorney.

Dec. 17, 1929.   L. F. FISHER   1,739,831
TOASTER
Filed June 15, 1929   3 Sheets-Sheet 3

Inventor
Lee Forrest Fisher,
By Hugh K. Wagner
Attorney.

Patented Dec. 17, 1929

1,739,831

UNITED STATES PATENT OFFICE

LEE FORREST FISHER, OF ST. LOUIS, MISSOURI

TOASTER

Application filed June 15, 1928. Serial No. 285,688.

This invention relates to a toaster for toasting bread and the like, and has primarily to do with improvements on a prior type of toaster invented by the same inventor and disclosed in his United States Patent 1,661,819, patented March 6, 1928. The said type of toaster comprises a heating means presenting two opposing sides and pair of toast-holders, each of which is adapted to hold a piece of toast opposite a respective side of the heating means, so that two pieces of bread may be toasted simultaneously. The arrangement is such that the positions of the toast-holders may be quickly exchanged without inverting them, so that the slices of bread that have been toasted on one side may be toasted simultanenously on their other sides without handling them to turn them over. When toasting buttered bread, the bread is placed on the holder with the buttered side on top, so that the holder that overlies the heating means presents the unbuttered side to the latter, while the holder that underlies the heating means presents the buttered side thereto. The buttered side toasts more slowly than the unbuttered side, and, to toast both sides in the same time to an equal degree, the buttered side must be correspondingly nearer to the heating means than the unbuttered side. According, the said prior toaster is provided with means for adjusting the vertical positions of the holders, whereby both holders may be set at more nearly equal distances from the heating means for the purpose of toasting unbuttered bread, or may be elevated so that the upper holder is sufficiently more remote from the heating means than the lower holder for the purpose of toasting buttered bread. However, the embodiment of this adjusting means in the toaster introduces complications in its structure, which it is the purpose of the present invention to avoid. Accordingly, an object of the present invention is to provide means whereby the toaster may be accommodated to the proper toasting of either buttered or unbuttered bread without requiring any adjustment of its holders with relation to the heating means. This object is attained by the optional introduction of means between the heating means and the toast of one holder whereby a portion of the heat that would otherwise normally have been transmitted to said toast is diverted to the toast of the other holder. While the invention includes the combination of such means with the toaster, and such combinations are claimed herein, it is thought that the aforesaid means are not only combinatively novel, but that certain of the devices going to make up such means are new in less combinations than the whole, and some are capable of individual use or in connection with heaters generally, and are therefore disclosed and claimed in another application for a heater filed by the same inventor simultanenously with the present application.

On the toaster of the aforesaid patent, the parallel motion mechanism for exchanging the positions of the toast-holders includes a middle lever and a pair of outer levers disposed parallel thereto on opposite sides thereof. It is also the purpose of the present invention to further simplify the toaster by providing a structure in which the middle lever may be omitted.

Other objects and advantages, more or less ancillary to the foregoing, will appear in the course of the following description of a preferred embodiment of the invention.

In the accompanying drawings forming part of this specification, in which like numbers of reference denote like parts wherever they occur, Figure 1 is a plan view, partly in section on the line 1—1 in Figure 2, of a toaster embodying this invention as it appears with the toast-holders extended or withdrawn from the heating means and with the heat-diverting means omitted;

Figure 1:
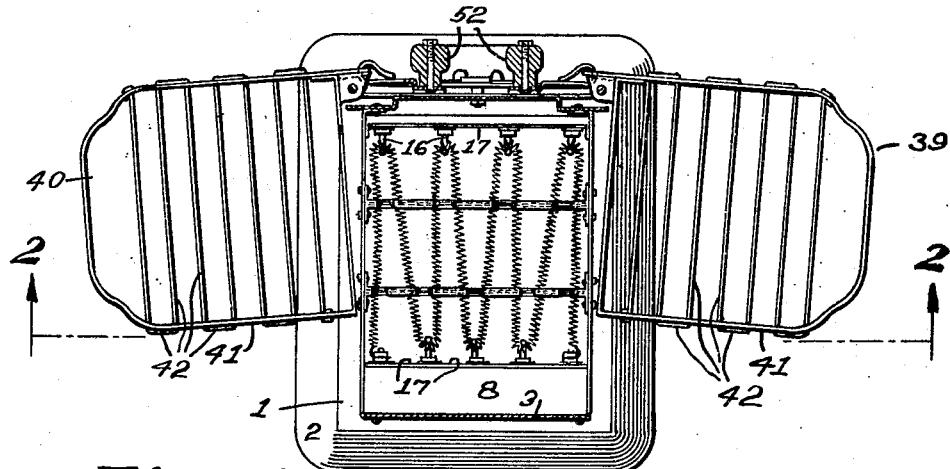

The supporting frame of the toaster is preferably formed of sheet metal and comprises a substantially rectangular base 1 having a downturned marginal flange 2, and uprights 3 and 4 secured to the base adjacent to and along the anterior and posterior lateral edges thereof, respectively. The upper ends of the uprights are bent outwardly to form flanges 5 that have secured thereto on opposite sides thereof complemental semi-cylindrical handle portions 6, preferably formed of insulating material and by means of which the toaster may be conveniently lifted and carried about. Ears 7, project laterally from the intermediate portions of the lateral edges of the posterior upright 4 and are offset into a plane disposed slightly forward of the plane of the upright 4. A channel-shaped bracket 8 is horizontally disposed along and has one of its depending flanges 9 secured to the intermediate portion of the inner side of the anterior upright 3. Side bars 10 connect the flange 9 to respective ears 7, being preferably provided with ears 11 that are suitably bolted thereto. A transverse channel bar 12 is provided with ears 13 at its opposite ends through which it is bolted to the side bars 10 immediately behind the ears 7. The web 14 of bar 12 and the flange 15 of channel bar 8 are provided with openings for the reception of suitable bolts 16 and adapted to be clamped thereto and to be insulated therefrom by suitable strips or plates 17 of dielectric material, preferably mica, clamped thereon by said bolts on opposite sides of said web 14 and flange 15. The bolts 16 borne by the web 14 and the intermediate bolts 16 borne by the flange 15 present inwardly projecting ends of hook formation adapted to sustain the bends of a coiled heating element or resistance wire 18, wound back and forth thereon and having its ends secured to the outer hookless or terminal bolts 16 of the flange 15. A pair of intermediate transverse bars 19 assist in supporting the strands of the element 18 and in spacing them a suitable distance apart. The bars 19 each comprise a dielectric strip 20, preferably mica, securely held between the opposing flanges 21 of the sheet metal channel beam 22, preferably by bolts 23. The flanges 21 are provided at their ends with ears 24 that are bolted to the side beams 10. The bars 19 are provided with slots or notches 25 in their upper edges to receive the strands of the element 18. The marginal edge 26 of each of the slots 25 in the dielectric strip 20 is projected inwardly with respect to the marginal edge 27 of each of the slots 25 in the metal flanges 21, so as to prevent contact of the element 18 with the flanges 21. The terminal bolts or binding screws 16 of the flange 15 are electrically connected by means of insulated leads 28 to respective prongs 29, borne by the wall 30 of a recess 31 formed in the rear of the base 1, but insulated therefrom by plates 32 of suitable dielectric, preferably mica. The prongs 29 are adapted to fit the recesses of a slide plug of a conventional type that forms one end of a well-known type of flexible cord or electric cable, the other end of which is of plug formation to fit any conventional or usual type of socket outlet of an electrical supply circuit.

Figure 2:
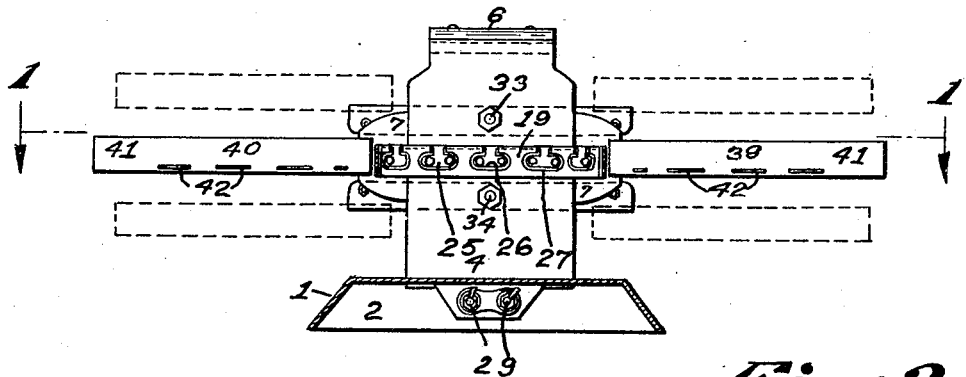
Figure 2 is a vertical sectional view taken on the line 2—2 in Figure 1.
Figure 3:
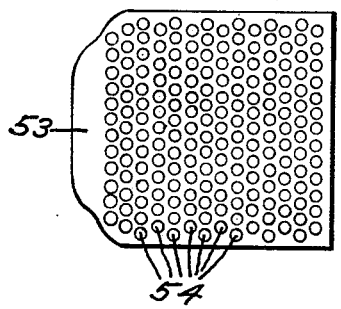
Figure 3 is a detail view of the heat-diverting means.
Figure 4:
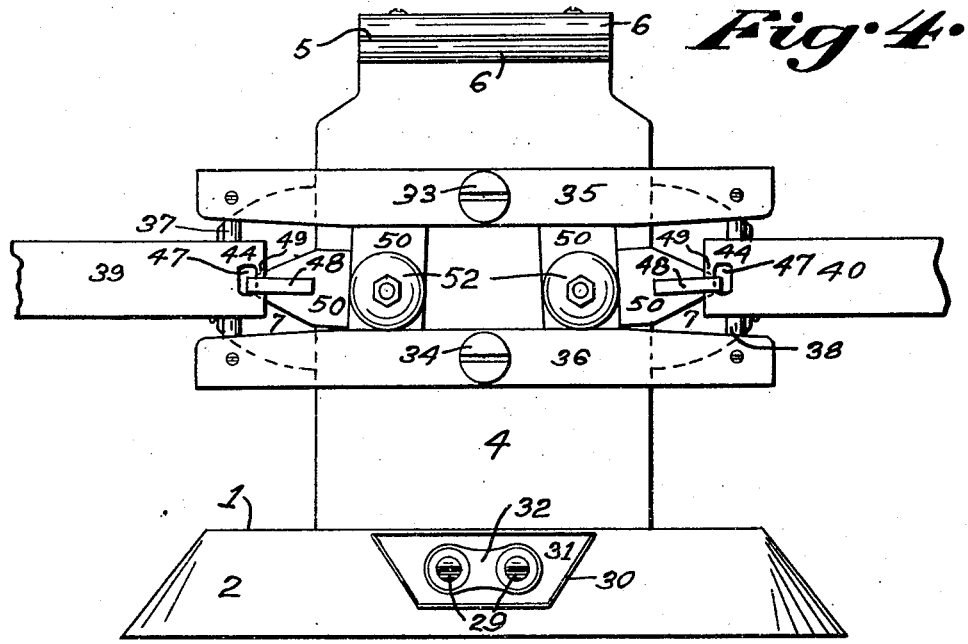
Figure 4 is a fragmentary rear end view of the toaster, exhibiting the holders in extended position.
Figure 5:
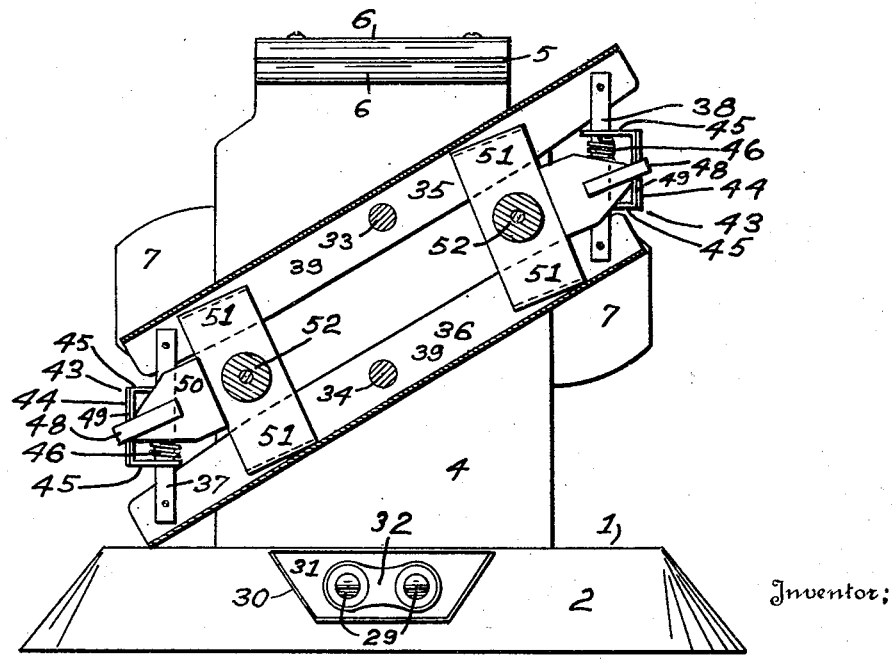
Figure 5 is a rear end view with the holders retracted into toasting position and with a longitudinal vertical central sectional view through the holder exchanging levers.
Figure 6:
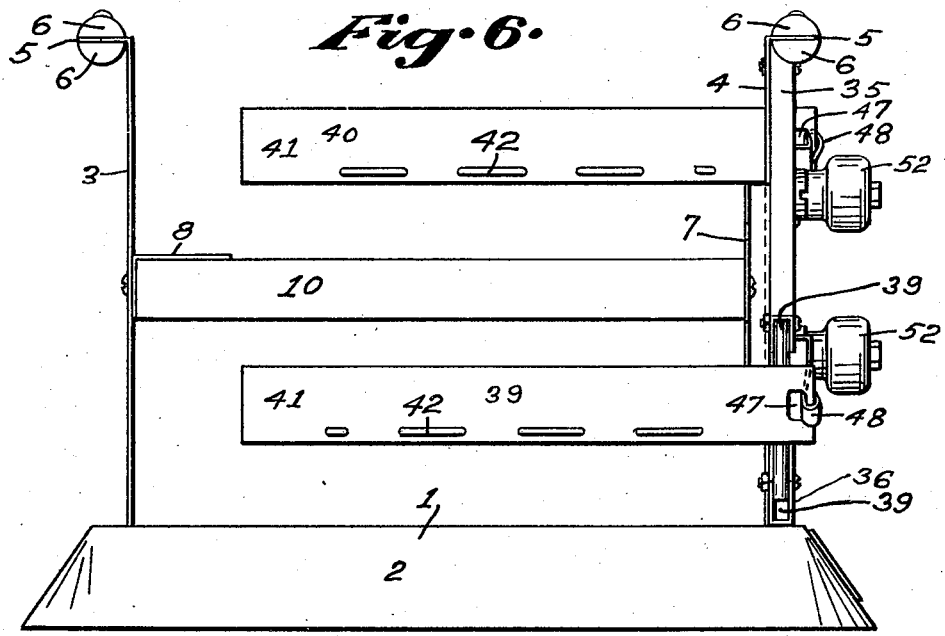
Figure 6 is a side elevation with the parts in the position shown in Figure 5.
Figure 7:
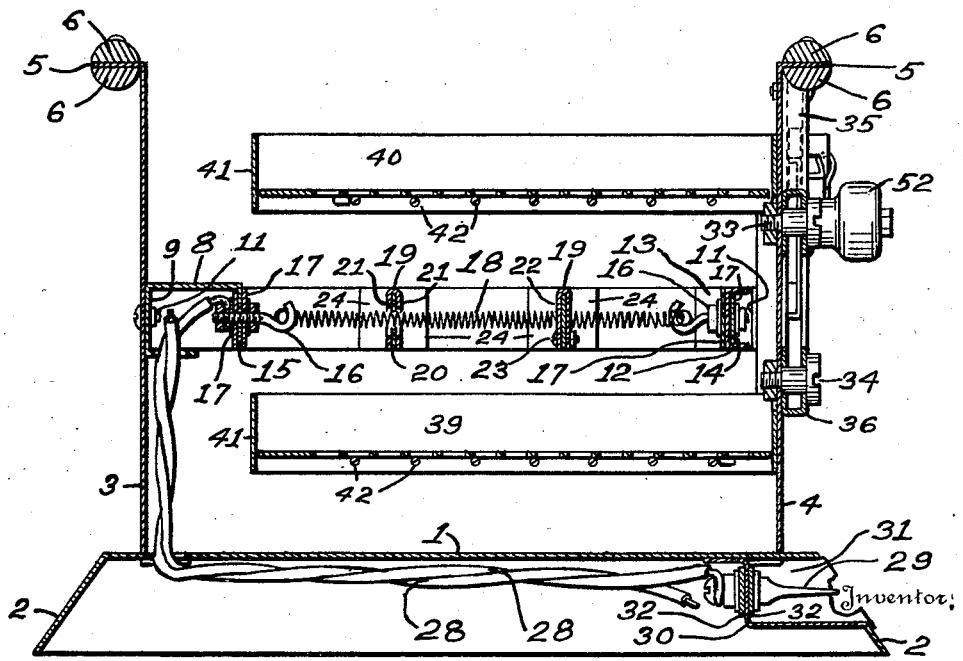
Figure 7 is a vertical longitudinal central sectional view with the parts positioned as in Figure 6.

A pair of studs 33 and 34 are affixed to the intermediate portion of the rear side of the upright 4 and in vertical alinement with one another. The said studs support a parallel motion mechanism comprising parallel levers 35 and 36, pivoted intermediately of their lengths to the studs 33 and 34 respectively; and parallel links 37 and 38, having their ends pivotally connected to the ends of the levers 35 and 36 so as to form a parallelogram therewith. The levers 35 and 36 are preferably of channel formation and are disposed with their channels 39$^a$ facing each other. The links 37 and 38 are preferably of cylindrical formation, with their ends disposed in the channels 39$^a$, and form vertical pivotal axes for respective toast-holders 39 and 40. Each of the holders 39 and 40 comprises a horizontal substantially rectangular sheet metal enclosing lateral wall 41, the opposing side portions of which are provided with a series of openings along the bottom thereof, through which an elongated element or wire 42 passes back and forth across the open bottom to form a support for the toast or the perforated plate to be hereinafter referred to. Each of the holders 39 and 40 is provided with channel-shaped lugs 43 that project therefrom adjacent the vertical links or pins 37 and 38, the vertical web 44 of the channel preferably forming a continuation of the side wall of the holders and the upper and lower flanges or ears 45 that project inwardly from said web being perforated to receive the pins 37 and 38. Torsional springs 46 encompass the pins 37 and 38 intermediary of the ears 45, and tend to swing the holders inwardly into vertical alinement with the heating means 18, one end of each spring being connected to a respective one of the ears 45 and the opposite end being connected to the respective pin 37 or 38 associated therewith. Each of the webs 44 of lugs 43 is perforated at 47 to provide clearance for a tongue 48, that encircles the outer end portion 49 of the webs 44 and is formed integral with a respective plate 50 that presents oppositely disposed guide tongues 51 each adapted to reciprocate in the channel 39 of a respective lever 35 or 36. Knobs 52 are secured to the rear sides of the plates 50 and together therewith constitute means for operating the holders 39 and 40. It is manifest that, when both knobs 52 are pressed toward one another, the holders will be swung outwardly against the opposition of the springs 46, as shown in Figures 1, 2 and 4; and when the handles 52 are released, the holders will be returned to their inner positions over and under the heating means 18 by reason of the impulsion of springs 46, provided the levers 35 and 36 are inclined in an extreme position, as shown in Figures 5, 6, and 7. When these levers, however, are tilted from their extreme positions to intermediate positions, while the knobs 52 are pressed inwardly towards one another, the return of the holders to their inward positions is prevented when the knobs 52 are again released, because the path of the returning holders is interrupted by the side bars 10, as shown in Figures 1 and 2. For the reason to be presently set forth, means is provided that is adapted optionally to be interposed between the heating means 18 and the toast of one holder to divert from said toast to the toast of the other holder a portion of the heat that would otherwise normally have been transmitted to the said first-mentioned toast. In the invention herein described, the said means consists of a metal heat-reflecting plate 53, adapted to be placed in the toast holders 39 and 40 and to be supported on the cross wires 42, and having a plurality of perforations 54 through which a portion of the heat from the heating source 18 is transmitted to the toast thereon, the plate in the upper toast-holder reflecting to the toast in the lower holder another portion of the heat that would otherwise, in the absence of said plate, normally have been transmitted to the toast in the upper holder.

The construction of the toaster having been fully described, the manner of using it will be readily understood. Assuming that unbuttered bread is to be toasted and that the parts of the toaster are in the positions shown in Figures 5, 6, and 7, with the plates 53 removed from the holders, the handles 52 are pressed inwardly toward one another until the holders 39 and 40 are swung outwardly into their extreme positions, when the levers 35 and 36 are turned by means of the knobs 52 into the horizontal position shown in Figures 1, 2, and 4, wherein the side bars 10 prevent the toast-holders from being swung inwardly when the knobs 52 are released. The bread is next placed in the holders, and the knobs 52 are manipulated to return the parts to the positions shown in Figures 5, 6, and 7. An electrical connection having been effected from a source of electrical energy to the prongs 29, the bottom of the bread in the upper holder 40 and the top side of the bread in the lower holder 39 are toasted in the same time to the desired degree, when the handles 52 are again manipulated to exchange the positions of the holders, so that holder 39 is now over the heating means and holder 40 is under the heating means. In this position, the remaining sides of the bread will be toasted, after which the knobs 52 may again be manipulated to swing the holders outwardly in position for removing the toast therefrom. Should the toaster be employed for making buttered toast, the plates 53 are placed in the holders, and the bread placed on the plates with the buttered side on top and, the proper amount of heat being diverted by the plate 53 in the upper holder from the unbuttered bottom of the toast therein to the buttered top of the toast in the lower holder, the upper buttered side of the bread in the lower holder will be toasted to the same degree in the same time as the unbuttered bottom side of the bread in the upper holder. When one side of each piece of bread has been toasted, the positions of the holders may be exchanged to toast the reverse sides of the bread.

It will be observed that the knobs 52, plates 50, and levers or bars 35 and 36 and their associated parts form means for rapidly exchanging the positions of the holders without inverting them, making it unnecessary to turn the bread over by hand to toast the reverse side. It will be observed that this means is a substantial improvement over the corresponding mechanism disclosed in the aforesaid prior patent, there being only two levers 35 and 36, and these two being wider and more rigid and having their pivotal openings symmetrically disposed on opposite sides of the pins 37 and 38, thereby reducing wear and distortion of the parts. Furthermore, no vertical adjustments of the positions of the holders need be effected to accommodate the toaster to making buttered or unbuttered toast.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. In a toaster, a support, heating means borne thereby and presenting opposing radiating sides, a toast-holder pivoted to said support and capable of movement in a plane parallel to the heating means, reciprocatory means for operating said holder, and a pair of members engaging respective opposite sides of said operating means to guide the latter.

2. In a toaster, a support, heating means borne thereby and presenting opposing radiating sides, a toast-holder pivoted to said support and capable of movement in a plane parallel to the said sides, reciprocatory means for operating said holder, and a pair of members having channels to reciprocatively receive opposite sides of said operating means to guide the latter.

3. In a toaster, a support, heating means borne thereby and presenting opposing radiating sides, a pair of members each intermediately pivoted to said support so as to be tiltable transversely to the said sides, a pair of pins each disposed transversely to the plane of the heating means and having its opposite ends pivotally connected to respective correspondings ends of said members so as to maintain them in substantially parallel relation, a pair of toast-holders, each of which is pivoted about a respective pin so as to be shiftable past one side of the heating means when the members are tilted in one direction and past the opposite side of the heating means when the members are tilted in the opposite direction, and means adapted to reciprocate between and to be guided by each of said members for operating said holders.

4. In a toaster, a support, heating means borne thereby and presenting opposing radiating sides, a pair of channel bars each intermediately pivoted to said support with their channels facing each other and so as to be tiltable transversely to the said sides, a pair of pins each disposed transversely to the plane of the heating means and having its opposite ends disposed in the channels and pivotally connected to respective corresponding ends of said bars so as to maintain them in substantially parallel relation, a pair of toast-holders, each of which is pivoted about a respective pin so as to be shiftable past one side of the heating means when the bars are tilted in one direction and past the opposite side of the heating means when the bars are tilted in the opposite direction and reciprocatory means for operating said holders and provided with opposing guide tongues each adapted to reciprocate in a respective channel.

5. In a toaster, a support, heating means borne thereby and presenting opposing radiating sides, a pair of channel members tiltably supported by said support, a pair of toast-holders pivotally disposed at the outer ends of said members and capable of movement in a plane parallel to the heating means and means for operating said holders, said means including guides slidably arranged within said channel members and adapted to be reciprocated therein.

6. In a toaster, a support, heating means borne thereby and presenting opposing radiating sides, a pair of members pivoted to said support intermediate their ends, each of said members being channel-like in cross-section, the open ends of the channels being opposite each other, a pair of pins, each pivotally connecting the extremities of said members, toast holders pivotally borne by said pins and capable of movement in a plane parallel to said heating means and guides operatively connected to said holders and extending within the open ends of said channels, and adapted to be reciprocated within the same for the purpose specified.

In testimony whereof I hereunto affix my signature.

LEE FORREST FISHER.